United States Patent
Kuraya

(10) Patent No.: US 8,989,489 B2
(45) Date of Patent: Mar. 24, 2015

(54) CONTROL APPARATUS CONTROLLING PROCESSING OF IMAGE READ BY READING DEVICE

(71) Applicant: Brother Kogyo Kabushiki Kaisha, Nagoya-shi, Aichi-ken (JP)

(72) Inventor: Mayumi Kuraya, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 109 days.

(21) Appl. No.: 13/931,974

(22) Filed: Jun. 30, 2013

(65) Prior Publication Data
US 2014/0010457 A1    Jan. 9, 2014

(30) Foreign Application Priority Data
Jul. 5, 2012 (JP) .................................. 2012-151921

(51) Int. Cl.
G06K 9/34 (2006.01)
G06K 9/46 (2006.01)
G06K 9/20 (2006.01)

(52) U.S. Cl.
CPC ................ *G06K 9/46* (2013.01); *G06K 9/2063* (2013.01)
USPC ............ 382/176; 358/453; 358/462; 358/472

(58) Field of Classification Search
USPC .......... 382/162, 164–167, 175–176; 358/453, 358/462, 472–474, 1.9
See application file for complete search history.

(56) References Cited

U.S. PATENT DOCUMENTS

| | | | |
|---|---|---|---|
| 5,796,928 A * | 8/1998 | Toyomura et al. | 358/1.6 |
| 6,882,447 B1 | 4/2005 | Nakajima et al. | |
| 7,031,003 B2 * | 4/2006 | Nagai et al. | 358/1.13 |
| 8,427,669 B2 * | 4/2013 | Kadota | 358/1.15 |
| 8,848,213 B2 * | 9/2014 | Fenelon | 358/1.15 |
| 2002/0167690 A1 * | 11/2002 | Fujii et al. | 358/539 |
| 2009/0303508 A1 * | 12/2009 | Tanaka | 358/1.9 |
| 2010/0085617 A1 | 4/2010 | Nakamura | |
| 2012/0008179 A1 | 1/2012 | Kaigawa | |

FOREIGN PATENT DOCUMENTS

| | | | |
|---|---|---|---|
| EP | 2 506 551 | * | 10/2012 |
| JP | H10-200769 A | | 7/1998 |
| JP | 2001-111814 A | | 4/2001 |
| JP | 2008-087224 A | | 4/2008 |
| JP | 2009-182930 A | | 8/2009 |
| JP | 2010-093589 A | | 4/2010 |
| JP | 2012-019483 A | | 1/2012 |

* cited by examiner

*Primary Examiner* — Samir Ahmed
(74) *Attorney, Agent, or Firm* — Merchant & Gould PC

(57) ABSTRACT

In a control apparatus, a controller operates as: identifying a reading condition instructed for reading an image from a document; and determining a method of an analysis processing, the identifying including identifying a reading section instructed to read an image from the document. If an identified reading condition satisfies a first condition including that an identified reading section is a first reading section configured to read an image from a document while maintaining the document to be stationary, a first analysis processing configured to extract a first type region from a read out image is determined. If the identified reading condition satisfies a second condition including that the identified reading section is a second reading section configured to read an image from the document while conveying the document, a second analysis processing configured to extract a second type region from the read out image is determined.

11 Claims, 10 Drawing Sheets

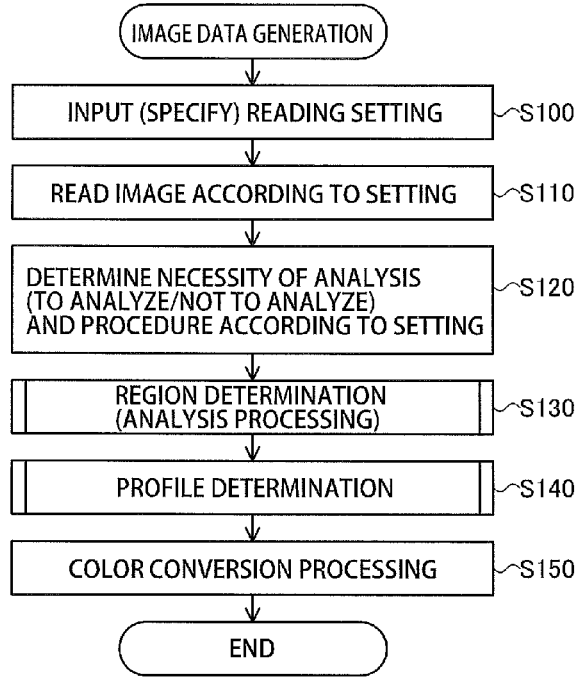

| SETTING ITEMS | OPTIONS | | | |
|---|---|---|---|---|
| DATA SIZE DS (COMPRESSION RATIO CR) | LARGE (LOW COMPRESSION RATIO) | MEDIUM (MEDIUM COMPRESSION RATIO) | SMALL (HIGH COMPRESSION RATIO) | |
| READING RESOLUTION RS (dpi) | 600 / 300 / 200 / 100 | | | |
| FILE FORMAT FF | JPEG / XPS / PDF / PDF/A / PDF WITH SIGNATURE / ENCRYPTED PDF / SEARCHABLE PDF / HIGH COMPRESSION PDF | | | |
| SPECIFIED READING SECTION RD | FIRST READING SECTION (FLAT BED (FB)) | SECOND READING SECTION (AUTOMATIC DOCUMENT FEEDER (ADF)) | | |
| READING AREA SIZE AS | L / A5 / A4 / A3 | | | |

Ci1 = Ci2

| FILE FORMAT FF | ANALYSIS |
|---|---|
| PDF / A / PDF WITH SIGNATURE / ENCRYPTED PDF / SEARCHABLE PDF | NOT TO ANALYZE |

| READING RESOLUTION RS | ANALYSIS |
|---|---|
| 100 | NOT TO ANALYZE |

| DATA SIZE DS (COMPRESSION RATIO CR) | ANALYSIS |
|---|---|
| SMALL (HIGH COMPRESSION RATIO) | NOT TO ANALYZE |

FIG. 6A  FIRST CASE C1 (READING SECTION RD = ADF, FORMAT FF=JPEG)

| RS \ DS (CR) | LARGE (LOW COMPRESSION RATIO) | MEDIUM (MEDIUM COMPRESSION RATIO) | SMALL (HIGH COMPRESSION RATIO) |
|---|---|---|---|
| 600 | TO ANALYZE | TO ANALYZE | NOT TO ANALYZE |
| 300 | TO ANALYZE | NOT TO ANALYZE | NOT TO ANALYZE |
| 200 | NOT TO ANALYZE | NOT TO ANALYZE | NOT TO ANALYZE |
| 100 | NOT TO ANALYZE | NOT TO ANALYZE | NOT TO ANALYZE |

FIG. 6B  SECOND CASE C2 (READING SECTION RD = ADF, FORMAT FF=PDF, XPS, HIGH COMPRESSION PDF)

| RS \ DS (CR) | LARGE (LOW COMPRESSION RATIO) | MEDIUM (MEDIUM COMPRESSION RATIO) | SMALL (HIGH COMPRESSION RATIO) |
|---|---|---|---|
| 600 | TO ANALYZE | NOT TO ANALYZE | NOT TO ANALYZE |
| 300 | NOT TO ANALYZE | NOT TO ANALYZE | NOT TO ANALYZE |
| 200 | NOT TO ANALYZE | NOT TO ANALYZE | NOT TO ANALYZE |
| 100 | NOT TO ANALYZE | NOT TO ANALYZE | NOT TO ANALYZE |

FIG. 6C  THIRD CASE C3 (READING SECTION RD = FB, FORMAT FF=JPEG)

| RS \ DS (CR) | LARGE (LOW COMPRESSION RATIO) | MEDIUM (MEDIUM COMPRESSION RATIO) | SMALL (HIGH COMPRESSION RATIO) |
|---|---|---|---|
| 600 | TO ANALYZE | TO ANALYZE | TO ANALYZE |
| 300 | TO ANALYZE | TO ANALYZE | NOT TO ANALYZE |
| 200 | TO ANALYZE | NOT TO ANALYZE | NOT TO ANALYZE |
| 100 | NOT TO ANALYZE | NOT TO ANALYZE | NOT TO ANALYZE |

FIG. 6D  FOURTH CASE C4 (READING SECTION RD = FB, FORMAT FF=PDF, XPS)

| RS \ DS (CR) | LARGE (LOW COMPRESSION RATIO) | MEDIUM (MEDIUM COMPRESSION RATIO) | SMALL (HIGH COMPRESSION RATIO) |
|---|---|---|---|
| 600 | TO ANALYZE | TO ANALYZE | NOT TO ANALYZE |
| 300 | TO ANALYZE | NOT TO ANALYZE | NOT TO ANALYZE |
| 200 | NOT TO ANALYZE | NOT TO ANALYZE | NOT TO ANALYZE |
| 100 | NOT TO ANALYZE | NOT TO ANALYZE | NOT TO ANALYZE |

FIG. 6E  FIFTH CASE C5 (READING SECTION RD = FB, FORMAT FF= HIGH COMPRESSION PDF)

| RS \ DS (CR) | LARGE (LOW COMPRESSION RATIO) | MEDIUM (MEDIUM COMPRESSION RATIO) | SMALL (HIGH COMPRESSION RATIO) |
|---|---|---|---|
| 600 | TO ANALYZE | NOT TO ANALYZE | NOT TO ANALYZE |
| 300 | NOT TO ANALYZE | NOT TO ANALYZE | NOT TO ANALYZE |
| 200 | NOT TO ANALYZE | NOT TO ANALYZE | NOT TO ANALYZE |
| 100 | NOT TO ANALYZE | NOT TO ANALYZE | NOT TO ANALYZE |

| RD \ AS | FIRST READING SECTION (FB) | | SECOND READING SECTION (ADF) |
|---|---|---|---|
| L | FIRST PROCEDURE (PERSON) | | SECOND PROCEDURE (GRAPHIC) |
| A5, A4, A3 | Rgr ≦ Rth | THIRD PROCEDURE (GRAPHIC AND PERSON) | |
| | Rgr > Rth | FOURTH PROCEDURE (GRAPHIC) | |

FIG. 15
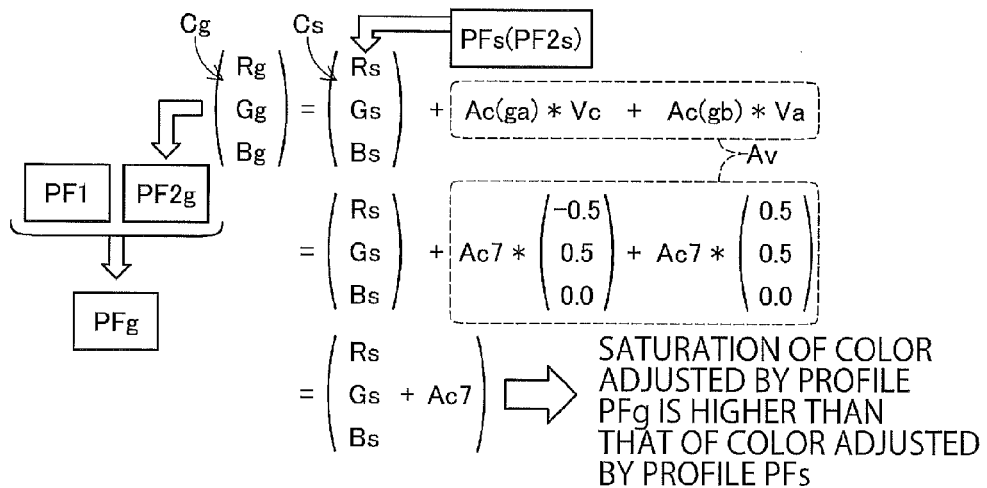
FIG. 16
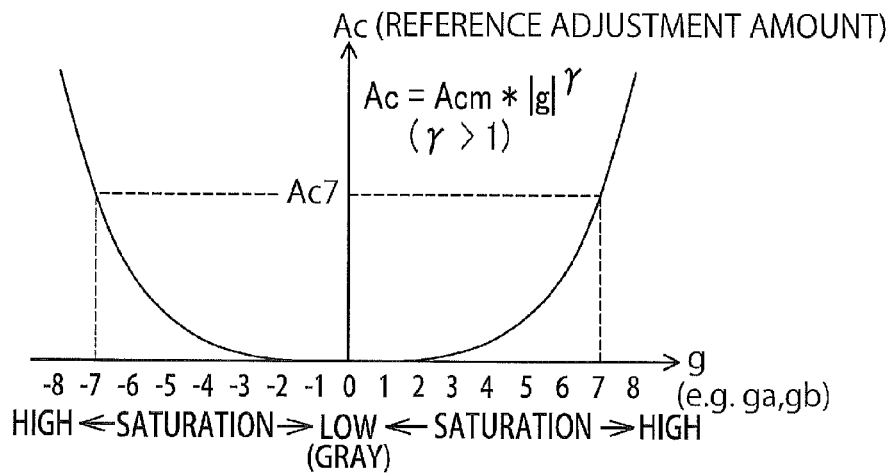
FIG. 17
| | R | G | B | |
|---|---|---|---|---|
| Va(gb>0) | 0.5 | 0.5 | 0.0 | |
| Vb(ga>0) | 0.5 | −0.5 | 0.0 | ⇒ INCREASE SATURATION |
| Vc(ga<0) | −0.5 | 0.5 | 0.0 | |
| Vd(gb<0) | 0.0 | 0.0 | 1.0 | |

CONTROL APPARATUS CONTROLLING PROCESSING OF IMAGE READ BY READING DEVICE

CROSS REFERENCE TO RELATED APPLICATION

This application claims priority from Japanese Patent Application No. 2012-151921 filed Jul. 5, 2012. The entire content of this priority application is incorporated herein by reference.

TECHNICAL FIELD

The present invention relates to a processing of an image read out by a reading device from a document.

BACKGROUND

There have been proposed various processings for being applied to images read out by an image reading device such as a scanner. For example, there has been proposed a method for analyzing an image obtained by scanning a document, judging a type of the document (text, halftone dots, or photographic paper, for example), and changing tables and/or parameters (setting values used for image processings) based on the determined type of the document. This method is disclosed in Japanese patent application publication No. 2009-182930, for example.

SUMMARY

A read out image can include various types of regions. So, it is difficult to properly analyze the read out image. This problem is not only for an image analysis, but also for an image processing that uses the results of an image analysis.

In view of the foregoing, it is an object of the invention to provide a control apparatus that can determine an image processing, including an analysis processing, suitable for a read out image.

In order to attain the above and other objects, the invention provides a control apparatus for controlling processing of an image read by a reading device, the reading device having a plurality of reading sections, each reading section being configured to read an image from a document. The control apparatus includes: a controller configured to operate as: identifying to identify a reading condition instructed for reading an image from a document; and determining to determine, in accordance with the identified reading condition, a method of an analysis processing to be applied to a read out image, the identifying to identify a reading condition including identifying to identify, among the plurality of reading sections, a reading section that is instructed to read an image from the document. If the identified reading condition satisfies a first condition, the determining to determine a method of an analysis processing includes determining a first analysis processing as the analysis processing to be applied to the read out image, the first condition including a condition that the identified reading section is a first reading section configured to read an image from a document while maintaining the document to be stationary, the first analysis processing being configured to extract a first type region from the read out image. If the identified reading condition satisfies a second condition, the determining to determine a method of an analysis processing includes determining a second analysis processing as the analysis processing to be applied to the read out image, the second condition including a condition that the identified reading section is a second reading section configured to read an image from the document while conveying the document, the second analysis processing being configured to extract a second type region from the read out image.

According to another aspect, the present invention provides a method for controlling processing of an image read by a reading device, the reading device having a plurality of reading sections, each reading section being configured to read an image from a document, the method including: identifying to identify a reading condition instructed for reading an image from a document; and determining to determine, in accordance with the identified reading condition, a method of an analysis processing to be applied to a read out image, the identifying to identify a reading condition including identifying to identify, among the plurality of reading sections, a reading section that is instructed to read an image from the document. If the identified reading condition satisfies a first condition, the determining to determine a method of an analysis processing includes determining a first analysis processing as the analysis processing to be applied to the read out image, the first condition including a condition that the identified reading section is a first reading section configured to read an image from a document while maintaining the document to be stationary, the first analysis processing being configured to extract a first type region from the read out image. If the identified reading condition satisfies a second condition, the determining to determine a method of an analysis processing includes determining a second analysis processing as the analysis processing to be applied to the read out image, the second condition including a condition that the identified reading section is a second reading section configured to read an image from the document while conveying the document, the second analysis processing being configured to extract a second type region from the read out image.

According to still another aspect, the present invention provides a non-transitory computer-readable medium storing a set of program instructions for controlling processing of an image read by a reading device, the reading device having a plurality of reading sections, each reading section being configured to read an image from a document, the program instructions, when executed by a computer, causing the computer to perform: identifying to identify a reading condition instructed for reading an image from a document; and determining to determine, in accordance with the identified reading condition, a method of an analysis processing to be applied to a read out image, the identifying to identify a reading condition including identifying to identify, among the plurality of reading sections, a reading section that is instructed to read an image from the document. If the identified reading condition satisfies a first condition, the determining to determine a method of an analysis processing includes determining a first analysis processing as the analysis processing to be applied to the read out image, the first condition including a condition that the identified reading section is a first reading section configured to read an image from a document while maintaining the document to be stationary, the first analysis processing being configured to extract a first type region from the read out image. If the identified reading condition satisfies a second condition, the determining to determine a method of an analysis processing includes determining a second analysis processing as the analysis processing to be applied to the read out image, the second condition including a condition that the identified reading section is a second reading section configured to read an image from the document while conveying the document, the second analysis processing being configured to extract a second type region from the read out image.

BRIEF DESCRIPTION OF THE DRAWINGS

The particular features and advantages of the invention as well as other objects will become apparent from the following description taken in connection with the accompanying drawings, in which:

FIG. 2 is a flowchart of image data generation processing executed by the multifunction apparatus shown in FIG. 1;

FIG. 3 is a table listing setting items and options for each setting item;

FIG. 4 is a schematic view illustrating an example of a read out image;

FIGS. 5A-5C are tables showing examples of a correspondence between reading setting and necessity of analysis processing, wherein FIG. 5A shows an example of a correspondence between file format and necessity of analysis processing, FIG. 5B shows an example of a correspondence between reading resolution and necessity of analysis processing, and FIG. 5C shows an example of a correspondence between data size (compression ratio) and necessity of analysis processing;

FIGS. 6A-6E are tables for respective combinations of specified reading section and file format, each table showing an example of a correspondence between combinations of reading resolution and data size (compression ratio) and necessity of analysis processing, wherein FIG. 6A is for first case C1 (combination of automatic document feeder and JPEG), FIG. 6B is for second case C2 (combination of automatic document feeder and PDF, XPS, or high compression PDF), FIG. 6C is for third case C3 (combination of flat bed and JPEG), FIG. 6D is for fourth case C4 (combination of flat bed and PDF or XPS), FIG. 6E is for fifth case C5 (combination of flat bed and high compression PDF);

FIG. 15 illustrates an example of an arithmetic expression used for generating type III profile (type III output profile);

FIG. 16 is a graph representing a relationship between grid value and reference adjustment amount;

FIG. 17 is a table representing a relationship between four distribution vectors and distribution coefficients for three color components of red, green, and blue; and FIGS. 18A-18C are schematic views of an example of a method of generating type III profile according to a second embodiment, wherein FIG. 18A is a graph representing a correspondence relationship between graphic ratio and index, FIG. 18B is a graph representing a correspondence relationship between saturation before color conversion and reference adjustment amount, and FIG. 18C is a graph representing a correspondence relationship between saturation before color conversion and saturation difference after color conversion.

DETAILED DESCRIPTION

A. First Embodiment

Figure 1:
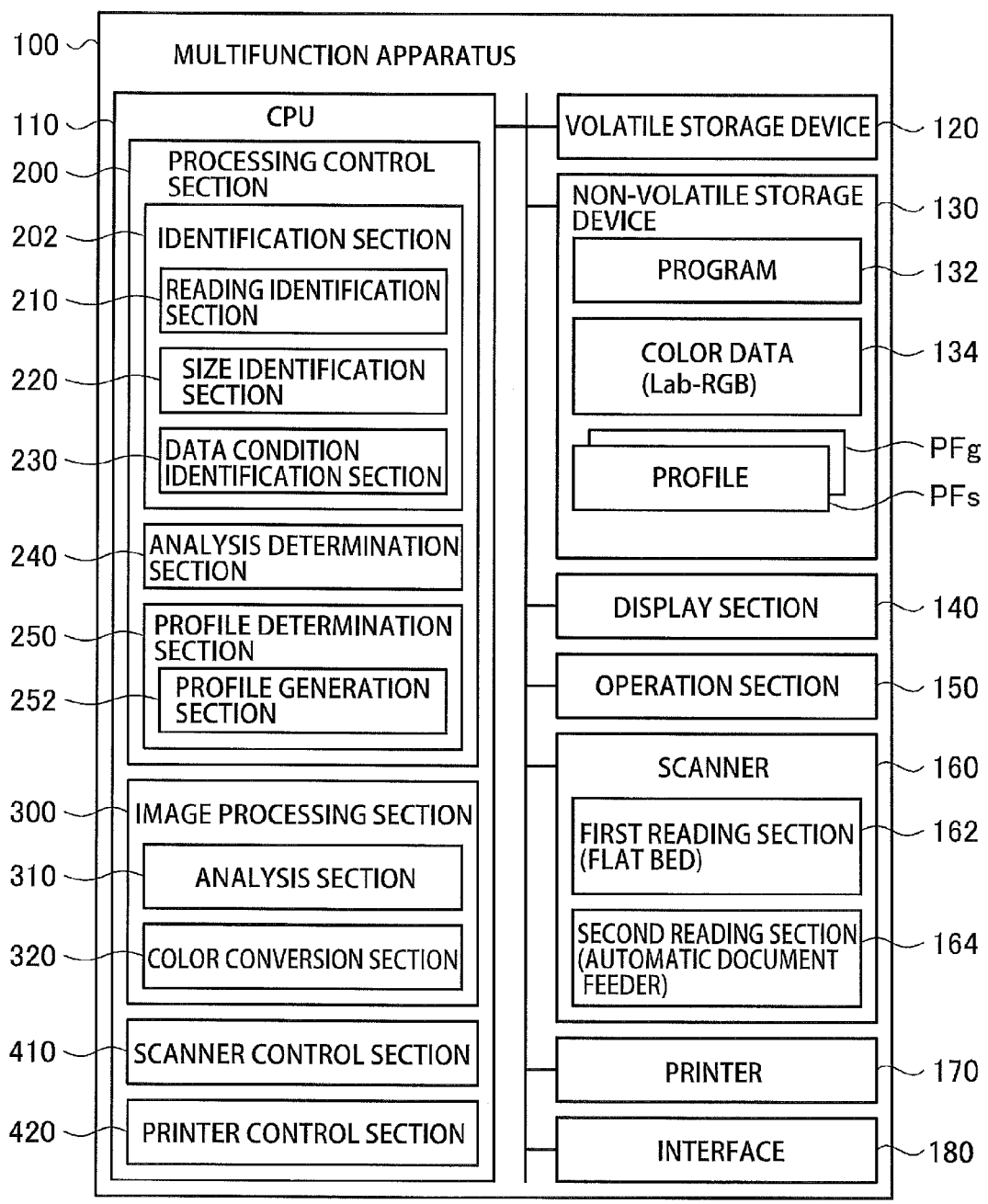
FIG. 1 is an explanatory view illustrating a multifunction apparatus according to a first embodiment of the present invention.

FIG. 1 is an explanatory view illustrating a multifunction apparatus 100 according to a first embodiment of the present invention. The multifunction apparatus 100 includes a CPU 110 that controls the entire part of the multifunction apparatus 100, a volatile storage device 120 such as a DRAM, a non-volatile storage device 130 such as a flashmemory, a display section 140, an operation section 150 such as a touch panel, a scanner 160, a printer 170, and an interface 180 for connecting another device (e.g., a USB flash memory) to the multifunction apparatus 100.

The scanner 160 includes a first reading section 162 and a second reading section 164. Although not shown, one optical sensor (Contact Image Sensor (CIS), for example) is commonly used by both of the first and second reading sections 162 and 164. Another configuration may be employed, in which the first reading section 162 includes a first optical sensor and the second reading section 164 includes a second optical sensor different from the first optical sensor.

The first reading section 162 includes a flat transparent plate (flat bed) on which a document is placed (hereinafter, the first reading section 162 is referred to also as "FB"). When the first reading section 162 is operated, the optical sensor is driven to move relative to the transparent plate, while the document is placed stationary on the transparent plate. While moving relative to the transparent plate, the optical sensor optically reads out, through the transparent plate, the document remaining stationary on the transparent plate. The optical sensor outputs a signal representing an image of the document (image represented by the document). The document is, for example, a sheet (paper, film, etc.) on a surface of which an image (character, line drawing, photograph, etc.) is recorded.

The second reading section 164 includes an ADF (Automatic document feeder) (hereinafter, the second reading section 164 is referred to also as "ADF"). A plurality of sheets' worth of documents are set by a user on the ADF. The ADF uses power of a motor to automatically feed the document sheet one by one. When the second reading section 164 is operated, the optical sensor remains stationary at a predetermined position and optically reads out the document fed by the ADF. The optical sensor outputs a signal representing an image of the document. The second reading section 164 further includes a size sensor for detecting a size of the document.

The non-volatile storage device 130 stores a program 132, color data 134, and color conversion profiles PFs and PFg (hereinafter, the color conversion profiles are referred to also merely as "profiles").

The CPU 110 executes the program 132 to function as a processing control section 200, an image processing section 300, a scanner control section 410, and a printer control section 420. The processing control section 200 includes an identification section 202, an analysis determination section 240, and a profile determination section 250. The identification section 202 includes a reading identification section 210, a size identification section 220, and a data condition identification section 230. The profile determination section 250 includes a profile generation section 252. The image processing section 300 includes an analysis section 310 and a color conversion section 320. Functions of the above-described processing sections will be described later.

FIG. 2 is a flowchart of image data generation processing. In the image data generation processing, image data representing an image of a document read by the scanner 160 (FIG. 1) is generated. This processing starts when a user operates the display section 140.

In step S100, the user operates the operation section 150 (FIG. 1) to input (specify) a reading setting (reading condition). The scanner control section 410 uses a signal from the operation section 150 to acquire the input reading setting and stores setting data representing the acquired reading setting in the volatile storage device 120.

FIG. 3 is a table listing the setting items and options for each setting item. The setting items are: "data size DS (compression ratio CR)", "reading resolution RS", "file format FF", "specified reading section RD", and "reading area size AS". The user can select (specify) one of the plurality of options for each setting item.

The data size DS (compression ratio CR) indicates a size (compression ratio) of image data to be generated, and the options thereof are: "large (low compression ratio)", "medium (medium compression ratio)", and "small (high compression ratio)". The reading resolution RS indicates a resolution set for image reading operation of the seamier 160, and options thereof are: "600", "300", "200", and "100," whose units are dpi (dots per inch). The file format FF indicates a format of image data to be generated, and options thereof are: "JPEG", "XPS", "PDF", "PDF/A", "PDF with signature", "encrypted PDF", "searchable PDF", and "high compression PDF". The "PDF/A" is a PDF for long storage. For example, a color profile and font data are embedded in a PDF data file for the "PDF/A". The "PDF with signature" is a PDF added with an electronic signature for confirmation of absence of falsification. The "encrypted PDF" is a PDF in which data is encrypted by a password. The "searchable PDF" is a PDF in which text data is embedded so as to allow the text in an image to be searched for. The "high compression PDF" is a PDF having a high compression ratio, which is generated by separating a document image into: a foreground image component representing characters, for example; and another remaining component, and applying compressions onto the thus separated components, respectively. The specified reading section RD indicates a reading section instructed to perform reading operation of the document image, and options thereof are: "first reading section (flat bed)" and "second reading section (ADF)". The reading area size AS indicates a size of a reading area on the transparent plate of the first reading section 162 (FIG. 1), and options thereof are: "L size", "A5", "A4", and "A3" (L<A5<A4<A3). The image reading area is previously determined for each document size. Generally, a size equal to the document size is selected as the reading area size AS. However, a size different from the document size can be selected. For example, when a size smaller than the document size is selected, part of the document is read out. It is noted that when the second reading section 164 is selected as the specified reading section RD, the scanner control section 410 uses a signal from the above-described size sensor to automatically determine the document size as the reading area size AS. The setting items and options for each setting item are not limited to the example shown in FIG. 3, but other various items and options may be adopted.

Subsequently, in step S110 of FIG. 2, the scanner control section 410 (FIG. 1) controls the seamier 160 based on the reading setting. The scanner 160 reads out an image from a document and outputs a signal representing the read out image. The scanner control section 410 uses the signal output from the scanner 160 to generate image data (referred to as "scan data") representing the read out image (referred to as "scan image") and stores the generated scan data in the volatile storage device 120. The scan data represents colors of individual pixels which are arranged in a matrix shape.

The color of each pixel is represented by color values of red R, green G, and blue B. The color value for each color indicates a level among 256 discrete levels.

Figures 4, 5A, 5B, 5C:
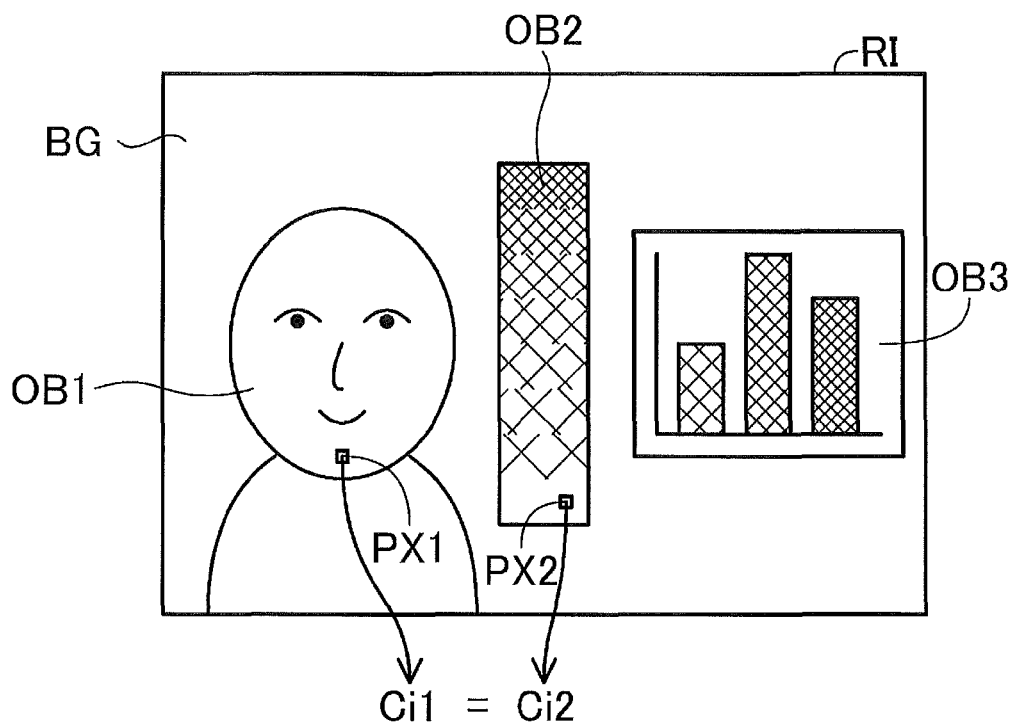

FIG. 4 is a schematic view illustrating an example of the read out image (scan image RI). The scan image RI includes a background BG, three objects (person OB1, gradation image OB2, and bar graph OB3). Now assume that a color value $Ci1$ of one pixel PX1 (referred to as "skin color pixel PX1") representing skin of a face of the person OB1 is equal to a color value $Ci2$ of one pixel PX2 (referred to as "graphic pixel PX2") representing the gradation image OB2.

Subsequently, in step S120 of FIG. 2, the identification section 202 (FIG. 1) reads out the setting data (reading setting) from the volatile storage device 120 and identifies the reading setting. More specifically, the reading identification section 210 identifies the specified reading section RD, the size identification section 220 identifies the reading area size AS, and the data condition identification section 230 identifies other items (data size DS, reading resolution RS, and file format FF). The analysis determination section 240 determines necessity of image analysis (analysis processing) depending on the identified reading setting and, if determining to perform the image analysis, determines a procedure of the image analysis based on the reading setting. In the present embodiment, a first analysis processing for extracting skin color regions each representing skin of human face (person's face) and a second analysis processing for extracting graphic regions each representing a graphic can be executed in step S130 of FIG. 2 to be described later. The graphic is an image represented by a drawing such as an illustration, a table, a graph, a line drawing, and a pattern.

As described later, the analysis processing is performed for enhancing image quality (e.g., visual appearance of color) of image data to be finally generated. The user is likely to determine the reading setting in accordance with importance of the image quality. Thus, the analysis determination section 240 determines whether to perform the image analysis based on the reading setting. A relationship between the importance of the image quality and reading setting is, for example, as follows: The larger the data size DS is (the lower the compression ratio is), the higher the importance of the image quality is likely to be. The higher the reading resolution RS, the higher the importance of the image quality is likely to be. Further, with regard to the file format FF, it is likely that the image quality is more important for a general-purpose format (e.g., JPEG, XPS, PDF, or high compression PDF) than for a format for a particular purpose (e.g., PDF/A, PDF with signature, encrypted PDF, or searchable PDF). Further, with regard to the specified reading section RD, it is likely that the image quality is more important for the case where the first reading section 162 (FB) is selected than for the case where the second reading section 164 (ADF) is selected.

FIGS. 5A-5C and 6A-6E are tables each showing an example of a correspondence between the reading setting and necessity of the analysis processing. As illustrated in FIG. 5A, if the file format FF is one of "PDF/A", "PDF with signature", "encrypted PDF", and "searchable PDF", a determination result is "not to analyze". As illustrated in FIG. 5B, if the reading resolution RS is "100", the determination result is "not to analyze". As illustrated in FIG. 5C, if the data size DS (compression ratio CR) is "small (high compression ratio)", the determination is "not to analyze".

FIGS. 6A to 6E show, respectively, five cases C1 to C5, in each of which "to analyze" or "not to analyze" is determined based on a combination of the reading resolution RS and data size DS (compression ratio CR). As illustrated in the figures, the combinations of the specified reading section RD and the file format FF are mutually different from one another among the five cases C1 to C5. In all the cases C1 to C5, the determination result "to analyze" is derived from combinations of relatively high reading resolution RS and relatively large data sizes DS (relatively low compression ratios CR). Which combinations derive the determination result "to analyze" are determined for the individual cases C1 to C5, respectively.

Figures 7, 8:
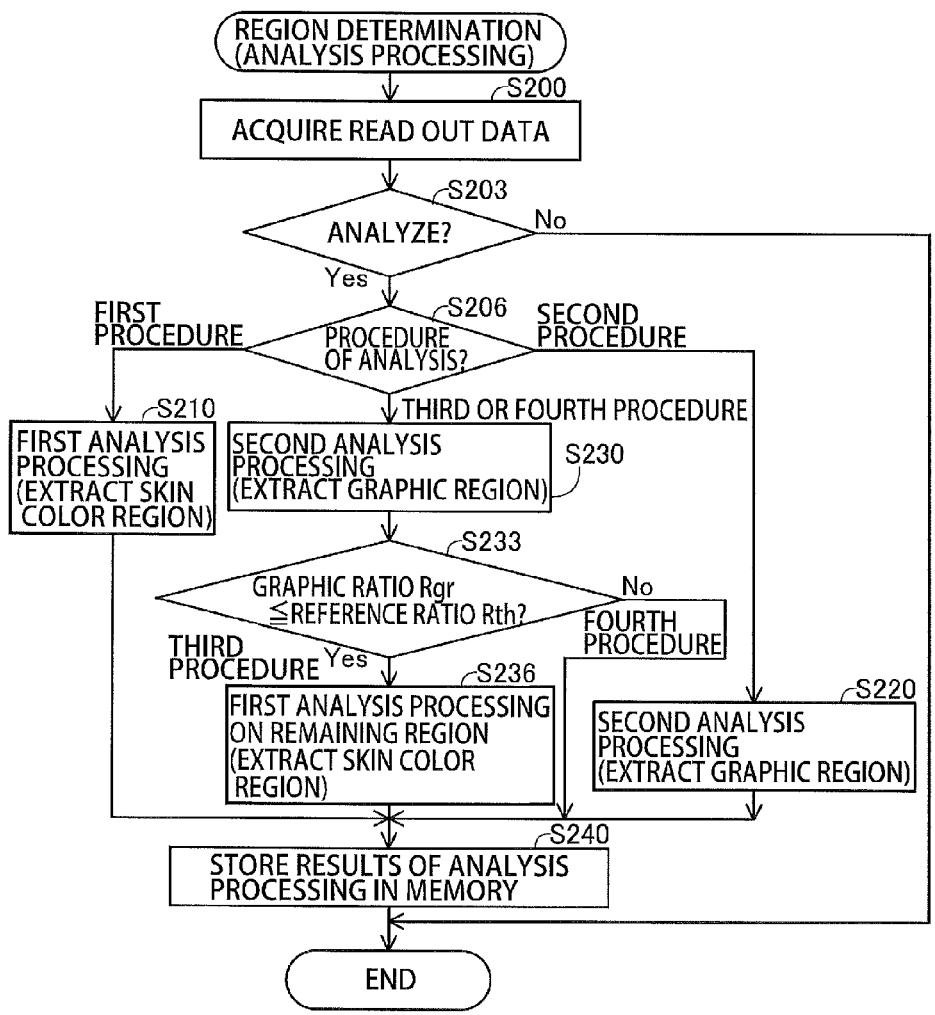
FIG. 7 is a table showing an example of a correspondence between reading settings and procedures of analysis processing to be executed.
FIG. 8 is a flowchart of a region determination processing (analysis processing) in FIG. 2.

When the determination result "to analyze" is derived in step S120 of FIG. 2, the analysis determination section 240 (FIG. 1) determines, based on the reading setting, a procedure of analysis processing to be executed. FIG. 7 is a table showing an example of a correspondence between the reading settings and the procedures of analysis processing to be executed. As illustrated in FIG. 7, first to fourth procedures of analysis processing are defined. Each procedure is for executing at least one of: the first analysis processing for analyzing human face (person face) skin color regions in the image; and the second analysis processing for analyzing graphic regions in the image.

If the specified reading section RD is "second reading section 164 (ADF)", the second analysis procedure is selected. The second analysis procedure is for executing the second analysis processing (graphic) and not executing the first analysis processing (person). If the specified reading section RD is "first reading section 162 (FB)", one procedure is selected depending on the reading area size AS. More specifically, if the reading area size AS is "L (smaller than A5)", the first analysis procedure is selected. The first analysis procedure is for executing the first analysis processing (person) and not executing the second analysis processing (graphic). If the reading area size AS is larger than or equal to "A5", one procedure is selected depending on a ratio of the total area of the graphic regions in the scan image RI (hereinafter, referred to as "graphic ratio Rgr"). Details of the graphic ratio Rgr will be described later. If the graphic ratio Rgr is lower than or equal to a prescribed reference ratio Rth, the third procedure is selected. The third procedure is for executing both the first analysis processing (person) and second analysis processing (graphic). If the graphic ratio Rgr is higher than the predetermined reference ratio Rth, the fourth procedure is selected. The fourth procedure is for executing the second analysis processing (graphic) and not executing the first analysis processing (person).

On the other hand, when the determination result "not to analyze" is derived, the analysis determination section 240 determines no procedure of analysis processing to be executed, and step S120 is ended.

Subsequently, in step S130 of FIG. 2, the analysis section 310 (FIG. 1) performs a region determination processing (analysis processing) according to the procedure determined by the analysis determination section 240. FIG. 8 is a flowchart of the region determination processing (analysis processing). In step S5200, the analysis section 310 acquires the scan data from the volatile storage device 120. Subsequently, in step S203, the analysis section 310 determines whether the determination result on the necessity of the analysis processing is "to analyze". If the determination result is "not to analyze" (No in S203), the routine of FIG. 8 is ended.

If the determination result is "to analyze" (Yes in S203), the analysis section 310 identifies in step S206 the procedure determined by the analysis determination section 240 (procedure of analysis processing). If the identified procedure is the first procedure (FIG. 7), the analysis section 310 performs the first analysis processing in step S210.

In the first analysis processing, the analysis section 310 first analyzes the scan data to extract regions indicative of human face (person face) from the scan image RI. For example, from the scan image RI of FIG. 4, a region representing the face of the person OB1 can be extracted as the face region. A face region can be extracted by a known processing method. For example, such a processing can be employed, in which edge pixels are detected in the scan image RI and, then, part similar to a prescribed human face pattern is extracted, as a face region, out of a pattern that is made up from the detected edge pixels. Alternatively, a processing that extracts a face region by pattern matching using a predetermined organ image (an image representing eyes or a mouth, for example) can be employed.

Then, the analysis section 310 extracts all the pixels (referred to as "skin color pixels") each having a color value falling within a predetermined skin color range (skin color gamut) from the detected face regions as skin color regions. For example, a region having the skin color in the face of the person OB1 can be extracted from the scan image RI of FIG. 4 as a skin color region. The skin color range (skin color gamut) is a range (color gamut), in which color values of pixels representing human skin can fall. The skin color range is defined by a combination of a range of the red R, a range of the green G, and a range of the blue B, for example.

In step S240 following step S210 (FIG. 8), the analysis section 310 extracts an unextracted region (a remaining region in the scan image RI excluding the skin color regions) as a standard region. The analysis section 310 stores results of the analysis processings (region extraction results) in the volatile storage device 120, and the routine (first procedure) of FIG. 8 is ended.

If the procedure identified in step S206 is the second procedure (FIG. 7), the analysis section 310 performs the second analysis processing in step S220. In the second analysis processing, the analysis section 310 analyzes the scan data to extract, from the scan image RI, regions each representing a polygon, as graphic regions. For example, a region of the gradation image OB2 and a region of the bar graph OB3 can be extracted from the scan image RI shown in FIG. 4 as graphic regions. A region representing a polygon can be extracted by a known processing method. For example, a processing method using Hough transformation can be employed.

In step S240 following step S220, the analysis section 310 extracts an unextracted region (a remaining region in the scan image RI excluding the graphic regions) as a standard region. The analysis section 310 stores the results of the analysis processings (region extraction results) in the volatile storage device 120, and the routine (second procedure) of FIG. 8 is ended.

The following describes the third and fourth procedures. As described above with reference to FIG. 7, one of the third and fourth procedures is selected depending on the graphic ratio Rgr. The graphic ratio Rgr is a ratio of the total area of the graphic regions (area ratio, i.e., ratio of the number of pixels) relative to the entire area of the scan image RI. At the timing when step S120 (FIG. 2) is executed, the graphic ratio Rgr has not yet been calculated. So, if the specified reading section RD is the first reading section 162 (FB) and the reading size AS is greater than or equal to A5, the analysis determination section 240 temporarily determines that a procedure to be applied is the third or fourth procedure. So, in such a case, the processing flow shifts from step S206 (FIG. 8) to step S230.

In step S230, the analysis section 310 performs the second analysis processing. The second analysis processing performed in S230 is the same as that performed in step S220. Subsequently, in step S233, the analysis determination section 240 calculates the graphic ratio Rgr using the graphic regions extracted in step S230 and determines whether the calculated graphic ratio Rgr is lower than or equal to the reference ratio Rth. That the graphic ratio Rgr is lower than or equal to the reference ratio Rth indicates that skin color regions (person) are likely to be included in the remaining region of the scan image RI excluding the graphic regions.

It is noted that the reference ratio Rth preferably has such a value (75%, for example) that allows skin color regions, having sizes large enough to largely influence the image quality of the scan image RI, to be included in the scan image RI. The reference ratio Rth may change depending on the reading setting. For example, the analysis determination section 240 may use, as the reference ratio Rth, such a value that increases as the reading area size AS increases.

When the graphic ratio Rgr is lower than or equal to the reference ratio Rth (Yes in S233), the analysis determination section 240 selects the third procedure (FIG. 7). In this case, the analysis section 310 performs in step S236 the first analysis processing for the remaining region of the scan image RI excluding the graphic regions. The first analysis processing performed in S236 is the same as that performed in step S210.

In step S240 following step S236, the analysis section 310 extracts an unextracted region (a remaining region excluding the graphic regions and skin color regions) as a standard region. The analysis section 310 stores the results of the analysis processings (region extraction results) in the volatile storage device 120, and the routine (third procedure) of FIG. 8 is ended.

When the graphic ratio Rgr is higher than the reference ratio Rth (No in S233), the analysis determination section 240 selects the fourth procedure (FIG. 7). In this case, the processing flow shifts to step S240. In step S240 of the fourth procedure, the analysis section 310 extracts an unextracted region (a remaining region excluding the graphic regions) as a standard region. The analysis section 310 stores the results of the analysis processings (region extraction results) in the volatile storage device 120, and the routine (fourth procedure) of FIG. 8 is ended.

Figure 9:
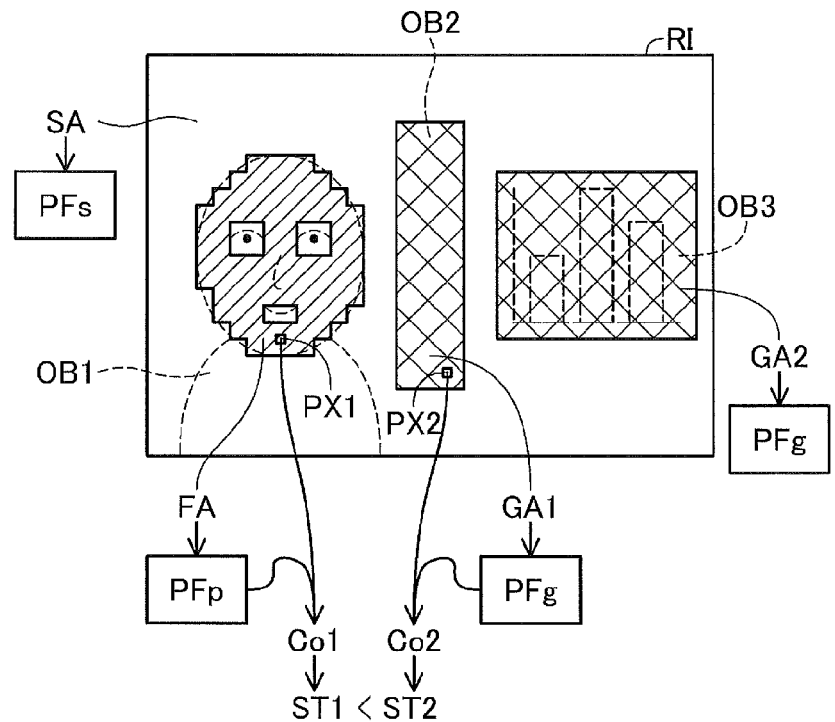
FIG. 9 is a schematic view illustrating an example of analysis results of the read out image shown in FIG. 4.

FIG. 9 is a schematic view illustrating an example of the analysis results of the scan image RI of FIG. 4. In FIG. 9, it is assumed that the third procedure has been selected. As described above, in the third procedure, the first analysis processing (for person) and second analysis processing (for graphic) are performed. As illustrated in FIG. 9, a skin color part of the face of the person OB1 is extracted as a skin color region FA. Further, a region representing the gradation image OB2 is extracted as a first graphic region GA1, and a region representing the bar graph OB3 is extracted as a second graphic region GA2. The remaining region is extracted as a standard region SA. Regions in the face region not having skin color, such as those regions representing eyes and mouth, are included in the standard region SA.

Figure 10:
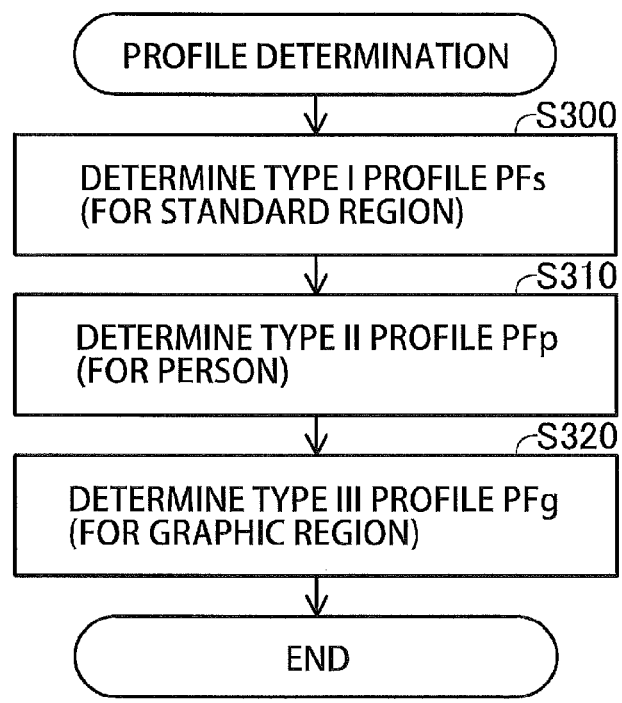
FIG. 10 is a flowchart of a profile determination process in FIG. 2.

In step S140 of FIG. 2, the profile determination section 250 determines a profile to be used for each region type. FIG. 10 is a profile determination flowchart. The profile determination section 250 determines a type I profile PFs for the standard region (S300), determines a type II profile PFp for the skin color regions (S310), and determines a type III profile PFg for the graphic regions (S320). If no skin color region has been extracted, step S310 is skipped. If no graphic region has been extracted, step S320 is skipped.

Each of the profiles PFs, PFg, and PFp defines a correspondence relationship between color values represented by the scan data (pre-conversion color values) and color values after color conversion (post-conversion color values). The type I profile PFs is determined such that the standard region will be represented by adequate colors. The type II profile PFp is determined such that skin color regions will be represented by preferable colors. The type III profile PFg is determined such that graphic regions will be represented by bright colors. Details of the profiles will be described later.

In step S150 of FIG. 2, the color conversion section 320 (FIG. 1) refers to the volatile storage device 120 to identify the extracted regions, and performs color conversion processing on each type of extracted region by using a corresponding profile, thereby adjusting colors of the image data. FIG. 9 illustrates a profile to be applied to each region. As shown in FIG. 9, the type I profile PFs is applied to the standard region SA, the type II profile PFp is applied to the skin color region FA, and type III profile PFg is applied to the graphic regions GA1 and GA2. Color values of the skin color region FA are converted into color values representing preferable colors. Color values of the respective graphic regions GA1 and GA2 are converted into bright color values.

For example, as described above with reference to FIG. 4, the color value Ci1 of the skin color pixel PX1 before conversion is equal to the color value Ci2 of the graphic pixel PX2 before color conversion. However, as illustrated in FIG. 9, a color value Co1 of the skin color pixel PX1 after conversion is different from a color value Cot of the graphic pixel PX2 after color conversion. In particular, the saturation ST2 of the graphic pixel PX2 after color conversion is higher than the saturation ST1 of the skin color pixel PX1 after conversion. Thus, if the scan image RI includes a person and a graphic, image data after conversion can represent the graphic with bright colors while representing the person with preferable colors.

The color conversion section 320 executes the color conversion processing to all the pixels constituting the scan image RI, to generate image data after conversion. The color conversion section 320 stores the generated image data in the non-volatile storage device 130, for example. Upon completion of the color conversion processing, the routine of FIG. 2 is ended. At this time point, the user can freely use the generated image data. For example, according to an instruction from the user, the color conversion section 320 stores the image data after color conversion in a storage device (not illustrated) connected to the interface 180. Further, the printer control section 420 may print an image using the image data after color conversion.

When the determination result on necessity of analysis is "not to analyze" in step S120 of FIG. 2, the profile determination section 250 determines the type I profile PFs as a profile to be applied to the entire scan image RI in step S300 of FIG. 10, and skips steps S310 and S320. In step S150 of FIG. 2, the color conversion section 320 applies the type I profile PFs to the entire scan image RI.

Figure 11:
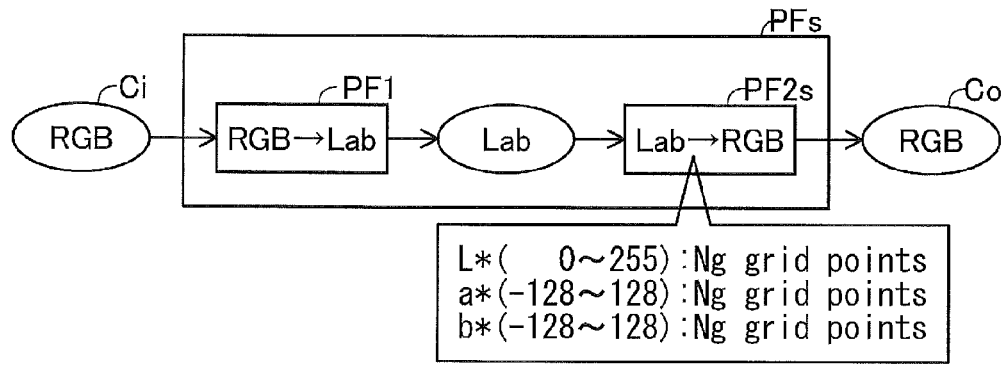
FIG. 11 is a schematic view of a type I profile.

The following describes details of the profiles. FIG. 11 is a schematic view of the type I profile PFs. An input color value Ci is a color value of a pixel in the scan image RI, while an output color value Co is a color value after color conversion for the same pixel. In the present embodiment, the input color value Ci and output color value Co are each represented in an RGB color space. That is, the input color value Ci is defined in an input RGB color space, and the output color value Co is defined in an output RGB color space. The type I profile PFs includes an input profile PF1 and an output profile PF2s (hereinafter, referred to also as "type I output profile PF2s"). The input profile PF1 associates the input RGB color space with an Lab color space (three components of L*, a*, and b*). The input profile PF1 is so-called an ICC profile for the scanner 160. In the Lab color space, L* is represented by a value in a range from 0 to 255, for example, a* is represented by a value in a range from −128 to 128, for example, and b* is represented by a value in a range from −128 to 128, for example. The output profile PF2s associates the Lab color space with the output RGB color space. In the output RGB color space, color components of red R, green G, and blue B are each represented by a value in a range from 0 to 255, for example. The output profile PF2s is previously determined such that the standard region will be represented with adequate colors. In step S300 of FIG. 10, the thus previously prepared type I profile PFs is determined as a profile to be applied to the standard region.

The profiles PF1 and PF2s are each in the form of a lookup table, for example. The output profile PF2s defines a correspondence relationship between "L*, a*, b*" and "R, G, B" for each of a plurality of grid points defined in the Lab color space. For example, the plurality of grid points are defined by dividing the Lab color space into a plurality of sections. In the embodiment of FIG. 11, the division number in the range of 0 to 255 for L*, division number in the range of −128 to 128 for a*, and division number in the range of −128 to 128 for b* are each equal to Ng (17, for example). One lookup table obtained by integrating the two profiles PF1 and PF2s may be employed as the type I profile PFs.

The following describes the type II profile PFp for skin color regions. The type II profile PFp is generated by substituting the type I output profile PF2s (FIG. 11) with a type II output profile PF2p. The profile generation section 252 (FIG. 1) generates one type II output profile PF2p for the scan image when the step S310 is executed for the scan image.

Figure 12:
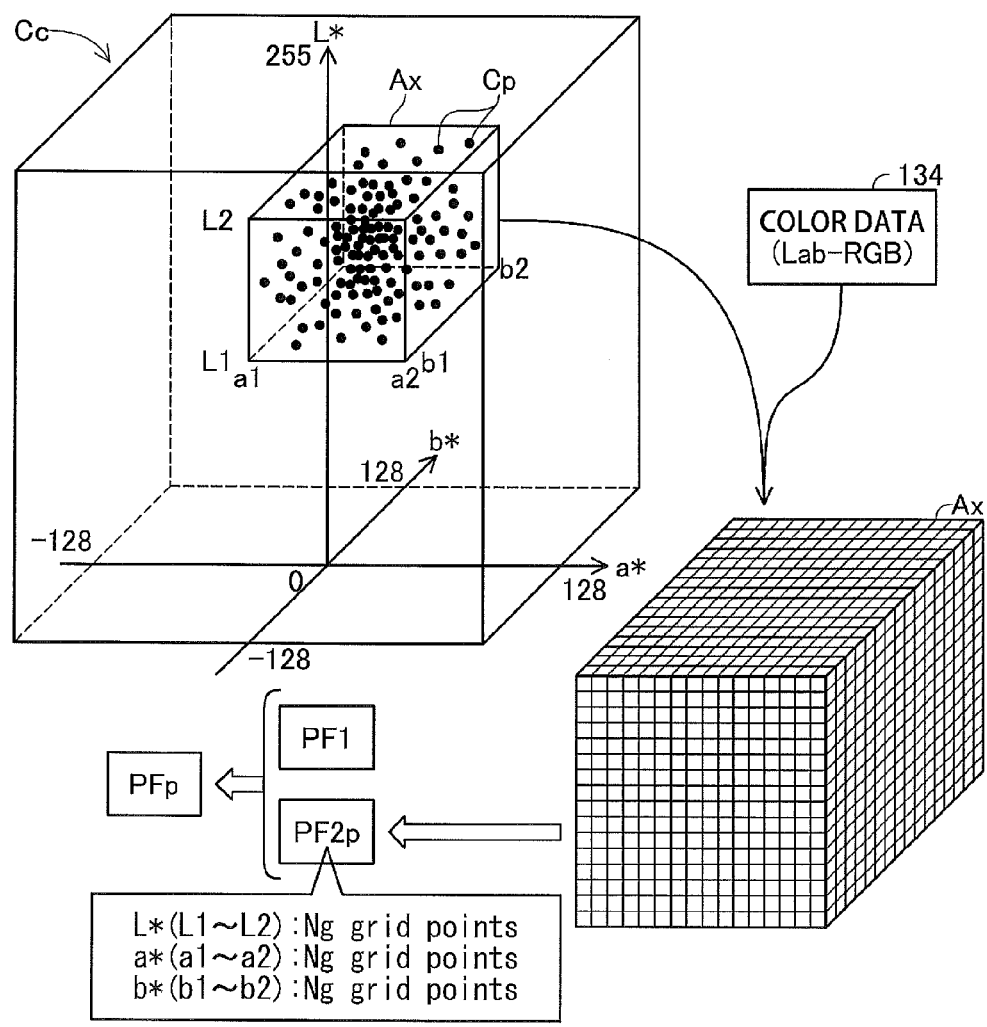
FIG. 12 is a schematic view of a type II profile.

FIG. 12 is a schematic view of the type II profile PFp. In FIG. 12, an Lab color solid Cc indicative of the entire Lab color space is illustrated. Color points Cp denote color points of those pixels that are included in the skin color regions in the scan image (scan image RI, for example). The color points Cp are calculated based on the RGB scan data (color values Ci in the scan data RI) using the input profile PF1 (FIG. 11). As shown in FIG. 12, a distribution portion Ax is defined as the smallest rectangular parallelepiped space within which all the color points Cp are included. The profile generation section 252 analyzes the scan data to identify the distribution portion Ax for the scan data. In the example of FIG. 12, the space inside the distribution portion Ax satisfies conditions of L1≤L*≤L2, a1≤a*≤a2, and b1≤b*≤b2.

The profile generation section 250 does not locate grid points outside the distribution portion Ax, but locates grid points only within the distribution portion Ax. The total number of the grid points thus located in the distribution portion Ax (L1≤L*≤L2, a1≤a*≤a2, and b1≤b*≤b2) is equal to the total number of the grid points located in the entire Lab color solid Cc (0≤L*≤125, −128≤a*≤128, and −128≤b*≤128) in the type I output profile PF2s (FIG. 11). Thus, the division numbers in the range of L1 to L2 for L*, in the range of a1 to a2 for a*, and in the range of b1 to b2 for b* are each equal to Ng (equal to the division numbers for the type I output profile PF2s). Accordingly, the type II output profile PF2p can define an input/output correspondence relationship within the distribution portion Ax (skin color regions) more finely than the type I output profile PF2s, and therefore can adjust the color of the skin color regions more finely than the type I output profile PF2s.

It is noted that the total number (referred to as "first grid number") of the grid points located within the distribution portion Ax (FIG. 12) may be different from the total number of grid points (referred to as "second grid number") in the type I output profile PF2s (FIG. 11). For example, the first grid number may be larger than the second grid number and, conversely, the first grid number may be smaller than the second grid number. It is preferable that the first grid number is larger than the number of grids that are located in the type I output profile PF2s within a range the same as that of the distribution portion Ax (L1≤L*≤L2, a1≤a*≤a2, and b1≤b*≤b2). This ensures that using the type II output profile PF2p allows finer definition of the input/output correspondence relationship within the skin color regions than using the type I output profile PF2s.

The profile generation section 252 refers to the color data 134 to determine an output color value for each of the plurality of grid points within the distribution portion Ax. It is noted that the color data 134 defines a predetermined correspondence relationship between L*a*b* and RGB in a predetermined skin color gamut. The color data 134 is in the form of a lookup table, for example. The profile generation section 252 determines the output color values for all the grid points in the distribution portion Ax to thereby generate the type II output profile PF2p. The profile generation section 252 then combines the type II output profile PF2p with the input profile PF1 to generate the type II profile PFp.

The color conversion section 320 can convert the color values in the skin color regions into more preferable color values by using the type II profile PFp than by using the type I profile PFs. That is, by using the type II profile PFp, the color conversion section 320 can convert the color values in the skin color regions into such color values that are different from and are preferable to those color values that will be obtained if the color conversion section 320 converts the color values by using the type I profile PFs.

The following describes the type III profile PFg for graphic regions. In the present embodiment, the type III profile PFg is previously determined similarly to the type I profile PFs. The type III profile PFg is configured such that saturations of color values after color conversion obtained by using the type III profile PFg become higher than those obtained by using the type I profile PFs. In the present embodiment, the type III profile PFg is generated by substituting the type I output profile PF2s (FIG. 11) with a type III output profile PF2g.

Figure 13:
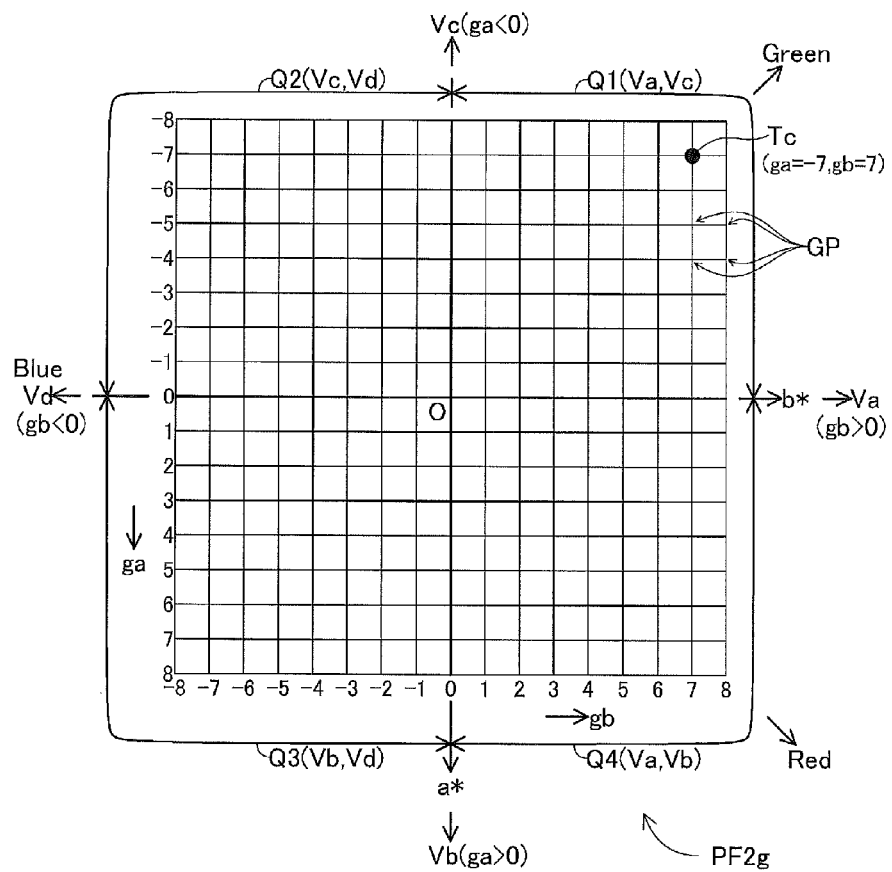
FIG. 13 is a schematic view of a cross section of an Lab color solid.

FIG. 13 is a schematic view of a cross section of the Lab color solid Cc indicative of the Lab color space (FIG. 12), taken along the a* b* plane for L*=50. An origin O indicates an achromatic color (a*=b*=0). Out of all the grid points that are located in the Lab color solid Cc (Lab color space) and are defined in the type III output profile PF2g, only those grid points GP whose lightness L* is equal to 50 are located in the cross section shown in FIG. 13. In this example, the division number Ng is 17. A first grid value ga represents a value a* of each grid point GP by using the number of grids. The first grid value ga is an integer from "−8" to "8". When a*=0, ga=0 is established. The larger the value a*, the larger the value ga. A second grid value gb represents a value b* of each grid point GP by using the number of grids. A relationship between gb and b* is the same as that between ga and a*.

Figure 14A:
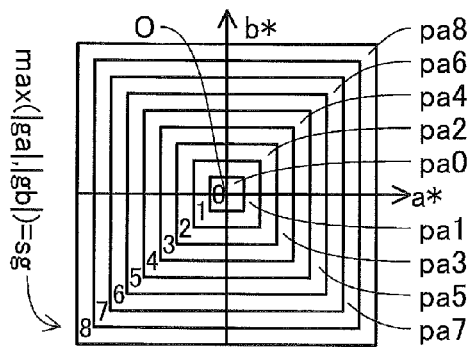
FIG. 14A illustrates a plurality of zones obtained by dividing an a* b* plane shown in FIG. 13 by saturation.

FIG. 14A illustrates nine zones pa0 to pa8 that are obtained by dividing the a* b* plane in FIG. 13 by saturation. The saturation is defined as a larger value among the absolute value (|ga|) of the first grid value ga and the absolute value (|gb|) of the second grid value gb. In other words, the saturation can be expressed by an expression (max (|ga|,|gb|)). Hereinafter, the saturation (max (|ga|,|gb|)) is referred to as "saturation sg". The saturation sg does not change in one zone. The "saturation sg" will be referred to also as "saturation sg before color conversion" hereinafter.

Figure 14B:
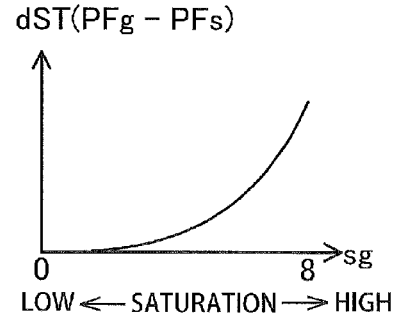
FIG. 14B is a graph representing a relationship between saturation before color conversion and saturation difference after color conversion.

FIG. 14B is a graph representing a relationship between the saturation sg before color conversion and a saturation difference dST after color conversion. A horizontal axis represents the saturation sg before color conversion, and a vertical axis represents the saturation difference dST after color conversion. The saturation difference dST after color conversion is a difference obtained by subtracting saturation of a color value after color conversion (post-conversion color value) that is obtained through color conversion from one color value (pre-conversion value) by using the type I profile PFs, from saturation of a color value after color conversion (post-conversion color value) that is obtained through color conversion from the same color value (pre-conversion value) by using the type HI profile PFg. The larger the saturation difference dST, the larger a difference between the post-conversion color value obtained by using the type I profile PFs and the post-conversion color value obtained by using the type III profile PFg. As a method of calculating the saturation from a color value after color conversion, a known method can be adopted. For example, a difference obtained by subtracting a minimum value among an R component value, a G component value, and a B component value from a maximum value thereamong can be defined as the saturation. The "saturation difference dST after color conversion" will be referred to also simply as "saturation difference dST" hereinafter.

As illustrated in FIG. 14B, the type III profile PFg is configured such that the higher the saturation sg before color conversion, the larger the saturation difference dST after color conversion. Thus, when using the type III profile PFg, the color conversion section 320 converts a color value having relatively high saturation into a color value having higher saturation than in the case of converting the same color value using the type I profile PFs.

Characteristics of the type III profile PFg (relationship between the saturation sg and the saturation difference dST) for L*=50 are described above with reference to FIGS. 13 and 14A-14B. The type III profile PFg has the same characteristics for L* of a value other than 50. It is noted, however, that the relationship between the saturation sg and saturation difference dST in the type III profile PFg may be different from one another according to the combinations of hue (e.g., angle from an axis of a*) and L*.

FIG. 15 illustrates an example of an arithmetic expression used for generating the type III profile PFg (type III output profile PF2g). The type III output profile PF2g can be generated by correcting the output color value for each of the plurality of grid points in the type I output profile PF2s. A type I output color value Cs (red Rs, green Gs, blue Bs) shown in FIG. 15 indicates the output color value for one grid point in the type I output profile PF2s, and a type III output color value Cg (red Rg, green Gg, blue Bg) indicates the output color value for the same grid point in the type III output profile PF2g. Now assume that the two output color values Cs and Cg are associated with the target grid point Tc (ga=−7, gb=7) shown in FIG. 13.

The type III output color value Cg is calculated by adding an adjustment amount Av to the type I output color value Cs. The adjustment amount Av is calculated in accordance with a reference adjustment amount Ac and distribution vectors (vectors Va and Vc for the target grid point Tc). The adjustment amount Av includes a reference adjustment amount Ac(ga) calculated using the first grid value ga and a reference adjustment amount Ac(gb) calculated using the second grid value gb.

More specifically, the type III output color value Cg (=(Rg, Gg, Bg)) is calculated from the type I output color value Cs (=(Rs, Gs, Bs)) as indicated by the following expression (1):

$$(Rg, Gg, Bg) = (Rs, Gs, Bs) + Av \quad (1)$$
$$= (Rs, Gs, Bs) + Ac(ga)*Vc + Ac(gb)*Va$$
$$= (Rs, Gs, Bs) + Ac7*(-0.5, 0.5, 0.0) +$$
$$\quad Ac7*(0.5, 0.5, 0.0)$$
$$= (Rs, Gs + Ac7, Bs)$$

It is noted that "*" is a multiplication symbol.

FIG. 16 is a graph representing a relationship between the grid value g and reference adjustment amount Ac. The relationship is expressed by the following expression (2):

$$Ac = Acm*|g|^\gamma \quad (2)$$

In FIG. 16, a horizontal axis represents the grid value g, and a vertical axis represents the reference adjustment amount Ac. The grid value g is the first grid value ga or second grid value gb that is used for calculating the reference adjustment amount Ac. The reference adjustment amount Ac is proportional to a power of the absolute value of the grid value g. The proportionality coefficient Acm is a predetermined value. The index γ is a predetermined value larger than 1 (e.g., 4). When the grid value g is zero, the reference adjustment amount Ac is also 0. When the grid value g is close to zero, the reference adjustment amount Ac is also close to zero. When the grid value goes away from zero, the reference adjustment amount Ac rises sharply as the distance of the grid value g from zero increases. In other words, when the saturation before color conversion is low, the reference adjustment amount Ac is close to zero; when the saturation before color conversion is high, the reference adjustment amount Ac is large. FIG. 16 shows that a seventh value Ac7 is obtained as the reference adjustment amount Ac when the absolute value of the grid value g is equal to 7.

FIG. 17 is a table representing a relationship between four distribution vectors Va, Vb, Vc, Vd and distribution coefficients for three color components R, G, B. The distribution coefficients are for being multiplied by the reference adjustment amount Ac. For example, in accordance with the first distribution vector Va, the adjustment amount for R component is calculated as 0.5*Ac, adjustment amount for G component is calculated as 0.5*Ac, and adjustment amount for B component is calculated as 0.0*Ac (symbol "*" is a multiplication symbol). The first distribution vector Va indicates coefficients for when the second grid value gb is positive, second distribution vector Vb indicates coefficients for when the first grid value ga is positive, third distribution vector Vc indicates coefficients for when the first grid value ga is negative, and fourth distribution vector Vd indicates coefficients for when the second grid value gb is negative.

FIG. 13 shows the following relationship between four quadrants Q1 to Q4 in the a* b* plane and distribution vectors to be used in the quadrants:
first quadrant Q1 in the upper right (gb>0, ga<0): Va, Vc;
second quadrant Q2 in the upper left (gb<0, ga<0): Vc, Vd;
third quadrant Q3 in the lower left (gb<0, ga>0): Vb, Vd; and
fourth quadrant Q4 in the lower right (gb>0, ga>0): Va, Vb.

Because the target grid point Tc (ga=−7, gb=7) is located within the first quadrant Q1 as shown in FIG. 13, the distribution vectors Va and Vc are used in the arithmetic expression shown in FIG. 15. The reference adjustment amount Ac(ga)

calculated from the first grid value ga (=−7) is equal to the seventh value Ac7 (FIG. 16). The reference adjustment amount Ac(gb) calculated from the second grid value gb (=7) is also equal to the seventh value Ac7. So, in order to determine the type III output color value Cg from the type I output color value Cs, the green component value Gs in the type I output color value Cs is added with the seventh value Ac7, while the red component value Rs and blue component value Bs in the type I output color value Cs are kept unchanged. The thus determined type III output color value Cg represents a green color having higher saturation than the type I output color value Cs.

The distribution vectors Va to Vd shown in FIG. 17 are configured such that saturation increases in each of the quadrants Q1 to Q4 shown in FIG. 13. For example, in the first quadrant Q1 where colors are close to green, the distribution vectors Va and Vc are used to significantly increase the G component as compared to the R and B components. So, saturation of green increases. In the second quadrant Q2 where colors are close to cyan, the distribution vectors Vc and Vd are used to significantly increase the B component as compared to the G component and to decrease the R component. So, saturation of cyan increases. In the third quadrant Q3 where colors are close to magenta, the distribution vectors Vb and Vd are used to decrease the G component and increase the R and B components. So, saturation of magenta increases. In the fourth quadrant Q4 where colors are close to red, the distribution vectors Va and Vb are used to significantly increase the R component as compared to the G and B components. So, saturation of red increases.

As described above, the type III output profile PF2g is determined by correcting the output color values of all the grid points in the type I output profile PF2s (FIG. 13) by using the reference adjustment amount Ac shown in FIG. 16 and the distribution vectors Va to Vd shown in FIG. 17. Then, the determined type III output profile PF2g is combined with the input profile PF1, to generate the type III profile PFg (FIG. 15).

Thus, in the present embodiment, as described above with reference to FIGS. 5A to 8, the analysis determination section 240 determines the image analysis procedure (analysis processing to be applied to the scan image RI) depending on the reading setting. Hereinafter, a condition required to be satisfied to select the first procedure (first analysis processing for skin color regions) is referred to as "first condition", and a condition required to be satisfied to select the second procedure (second analysis processing for graphic regions) is referred to as "second condition". The first condition contains a condition that the specified reading section RD is the first reading section 162 (FIG. 7). The second condition contains a condition that the specified reading section RD is the second reading section 164 (FIG. 7). In this way, the procedure of the analysis processing is determined depending on the reading section RD that is specified among the plurality of reading sections provided to the multifunction apparatus 100. So, image processing including analysis processing can be determined appropriately in accordance with the read out image.

Further, as illustrated in FIG. 10, the profile determination section 250 determines the type I profile PFs as a profile to be applied to a region (standard region) different from both the skin color regions and graphic regions, and determines the type II profile PFp as a profile to be applied to the skin color regions. This allows the type II profile PFp suitable for the skin color regions to be applied to the skin color regions. Further, as described above with reference to FIG. 12, the type II profile PFp is configured such that the color value after color conversion associated with the color value included in the skin color range (see the first analysis processing in FIG. 8) differs from the color value after color conversion based on the type I profile PFs. Thus, the profile determination section 250 can determine the type II profile PFp suitable for the skin color regions. Further, the image data after color conversion can represent the human skin color with adequate colors.

Further, the profile determination section 250 determines the type III profile PFg as a profile to be applied to the graphic regions. This allows the type III profile PFg suitable for the graphic regions to be applied to the graphic regions. Further, as described above with reference to FIG. 14B, the type III profile PFg is configured such that the higher the saturation before color conversion, the larger the saturation difference dST. Thus, the profile determination section 250 can determine the type III profile PFg that is suitable for such graphic regions that represent colors having high saturation. Further, image data after color conversion can represent a high saturation graphic with bright colors.

Hereinafter, a condition required to be satisfied to select the third procedure (first analysis processing for skin color regions and second analysis procedure for graphic regions) is referred to as "third condition". As illustrated in FIG. 7, the first condition for the first procedure further contains a condition that the reading area size AS is "L (smaller than A5)". The third condition for the third procedure contains a condition that the specified reading section RD is the first reading section 162 and the reading size area AS is a size larger than or equal to "A5". Thus, when the third condition is satisfied, analysis processing suitable for an image including both of person (skin color regions) and graphic is determined. In particular, as described above with reference to FIGS. 7 and 8, the third condition further contains a condition that the graphic ratio Rgr is lower than or equal to the reference ratio Rth. Thus, the third condition is satisfied when the scan image RI is likely to include both person (skin color regions) and graphic regions. So, the analysis determination section 240 can determine the analysis processing suitable for an image including both of skin color regions and graphic regions.

Further, as illustrated in FIGS. 5A-5C and 6A-6E, the analysis determination section 240 determines necessity of image analysis depending on the reading setting (reading condition). When the reading condition coincides with a first reading condition (condition associated with "not to analyze" in FIGS. 5A-5C and 6A-6E), the analysis determination section 240 determines no analysis processing to be applied to the scan image RI (S120 of FIG. 2), and the profile determination section 250 determines the type I profile PFs as a profile to be applied to the entire scan image RI (S300 of FIG. 10). When the reading condition coincides with a second reading condition (condition associated with "to analyze" in FIGS. 5A-5C and 6A-6E), the analysis determination section 240 determines analysis processings to be applied to the scan image RI (FIGS. 2, 7, and 8), and the profile determination section 250 determines profiles to be applied to the regions extracted as the results of the analysis processings (FIG. 10). In this way, when the reading condition coincides with the first reading condition, the analysis processing is skipped, thereby reducing a required processing time.

Further, as described above with reference to FIG. 12, the profile generation section 252 generates the type II profile PFp to be applied to the skin color regions based on the results of the analysis processing. Thus, a profile suitable for the actually read out scan image RI can be applied to the scan image RI.

B. Second Embodiment

Figure 18A:
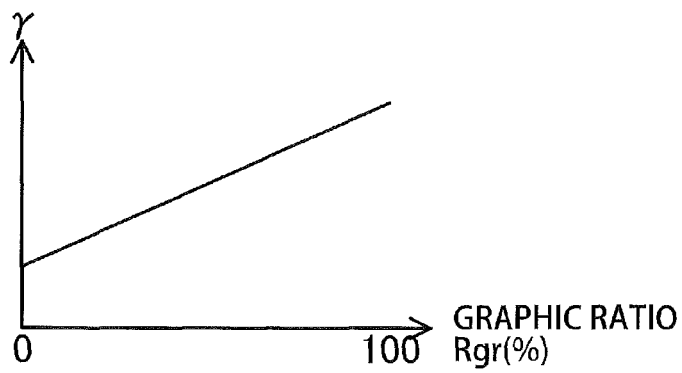
Figure 18B:
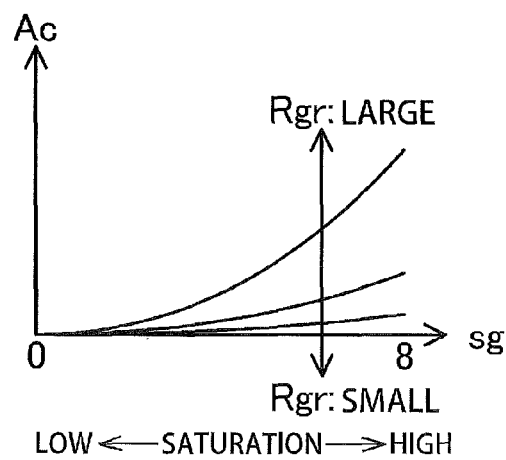
Figure 18C:
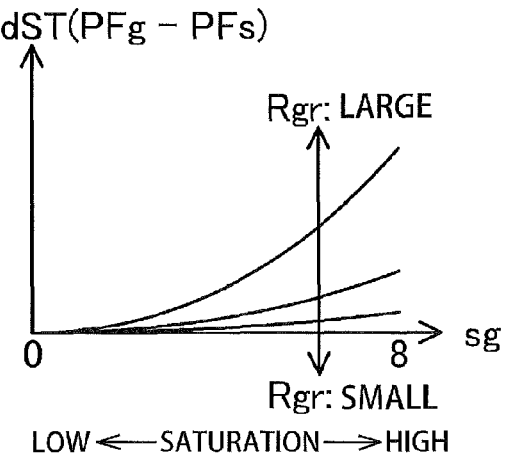

According to a second embodiment, in step S320 of FIG. 10, the profile generation section 252 (FIG. 1) generates the type III profile PFg depending on the results of the analysis processings. Other configurations in the second embodiment are the same as those in the first embodiment (FIGS. 1 to 17). FIGS. 18A-18C are schematic views of an example of a method of generating the type III profile PFg. FIG. 18A is a graph representing a correspondence relationship between the graphic ratio Rgr and index γ. A horizontal axis represents the graphic ratio Rgr, and a vertical axis represents the index γ. As illustrated in FIG. 18A, the higher the graphic ratio Rgr, the larger the index γ. The profile generation section 252 calculates the graphic ratio Rgr in a manner the same as that in the first embodiment which is described with reference to S233 (FIG. 8), and determines the index γ based on the calculated graphic ratio Rgr with reference to the graph shown in FIG. 18A. The profile generation section 252 calculates the reference adjustment amount Ac by using the determined index γ and by using the above-described expression (2) as shown in FIG. 16.

FIG. 18B is a graph representing a correspondence relationship between the saturation sg before color conversion and the reference adjustment amount Ac. The saturation sg before color conversion is defined in a manner the same as that in the first embodiment which is described with reference to FIG. 14A. A horizontal axis represents the saturation sg before color conversion, while a vertical axis represents the reference adjustment amount Ac. FIG. 18C is a graph representing a correspondence relationship between the saturation sg before color conversion and saturation difference dST after color conversion. The saturation difference dST after color conversion is defined in a manner the same as that in the first embodiment which is described with reference to FIG. 14B. A horizontal axis represents the saturation sg, and a vertical axis represents the saturation difference dST. FIG. 18B shows that the higher the saturation sg, the larger the reference adjustment amount Ac similarly to the case of FIG. 16 in the first embodiment. Further, FIG. 18C shows that, the higher the saturation sg, the larger the saturation difference dST (FIG. 18C) similarly to the case of FIG. 14B in the first embodiment.

FIG. 18B also shows changes in the correspondence relationship between the saturation sg and the reference adjustment amount Ac with respect to changes in the graphic ratio Rgr. FIG. 18C also shows changes in the correspondence relationship between the saturation sg and the saturation difference dST with respect to the changes in the graphic ratio Rgr. As shown in FIG. 18B, the larger the graphic ratio Rgr, the larger the reference adjustment amount Ac in the range of relatively low saturation sg. As a result, as shown in FIG. 18C, the larger the graphic ratio Rgr, the larger the saturation difference dST in the range of relatively low saturation sg.

In this way, the type III profile PFg is determined such that graphic regions are represented with brighter colors when the graphic ratio Rgr is relatively high in comparison with when the graphic ratio Rgr is relatively low. Therefore, image data after color conversion can represent, with brighter colors, such an image whose main part is constituted from graphic regions. Conversely, when the graphic ratio Rgr is relatively low, the type III profile PFg is generated so as to suppress increase in saturation of the graphic regions in comparison with when the graphic ratio Rgr is relatively high. Therefore, if a document includes a person and a relatively small sized graphic region, it is possible to reduce such a possibility that the small sized graphic region is represented with too bright colors and unintentionally stands out.

The method of generating the type III profile PFg may not be limited to the above-described method. One variation of the method of generating the type III profile PFg is described below. In this variation, the RGB output color values in the type I profile PFs are first converted into HSV color values, where H indicates hue, S indicates saturation, and V indicates value or brightness. Then, the HSV color values are adjusted so that saturation S of each HSV color value increases in a manner that the larger the saturation S before adjustment, the larger the amount by which the saturation S is increased. Then, the HSV color values after adjustments are converted back to the RGB color values, which are finally determined as the RGB output color values in the type III profile PFg.

C. Modifications (1) The regions extracted by the first analysis processing (see FIG. 8) will be referred to as "type I regions" hereinafter. In the embodiments, the first analysis processing is configured to extract skin color regions as the type I regions. However, the first analysis processing may be modified to extract regions other than the skin color regions. For example, the first analysis processing may extract blue-colored regions (sky regions) or green-colored regions (plant regions). Generally, the first analysis processing may be configured to extract regions represented by a prescribed color gamut.

As the configuration of the type II profile PFp for extracting the type I regions, various configurations may be employed, in each of which a color value after color conversion (post-conversion color value), which is associated with a first color value (pre-conversion color value) falling in the prescribed color gamut for the type I regions, becomes suitable for the type I regions. For example, the type II profile PFp may be configured such that a color value (post-conversion color value), into which the first color value (pre-conversion color value) will be converted by using the type II profile PFp, differs from a color value (post-conversion color value), into which the same first color value (pre-conversion color value) will be converted by using the type I profile PFs.

(2) The regions extracted by the second analysis processing (see FIG. 8) will be referred to as "type II regions" hereinafter. In the embodiments, the second analysis processing is configured to extract regions each representing a polygon as the type II regions. However, the second analysis processing may be modified to extract regions each representing a graphic other than a polygon, such as regions each representing a circle or an ellipse. As the method of extracting the type II regions, not only the Hough transformation, but also various methods such as a pattern matching may be employed.

In the embodiments, the type III profile PFg for the type II regions is configured such that the higher the saturation sg before color conversion, the larger the saturation difference dST after color conversion as shown in FIGS. 14B and 18C. However, as the configuration of the type III profile PFp for extracting the type II regions, other various configurations may be employed. For example, a color-component difference after color conversion is defined as a difference in at least one color component between a color point after conversion (post-conversion color point) that is obtained through color conversion from a color point (pre-conversion color point) by using the type I profile PFs and a color point after conversion (post-conversion color point) that is obtained through color conversion from the same color point (pre-conversion color point) by using the type III profile PFg. The at least one color component is at least one of color components of saturation, hue, and lightness (L*, for example). The difference in the at least one color component between the two post-conversion color points may be defined by a Euclidean distance between the two post-conversion color points. The type III profile PFg for the type II regions is configured to have particular characteristics in each part of the color space before color conversion where lightness (L*, for example) is fixed and hue is fixed. The particular characteristics are that the higher the saturation sg before color conversion, the larger the color-component difference after color conversion.

(3) The type II profile PFp or type III profile PFg may be used as a profile for the standard region. In this case, the type I profile PFs is omitted. The standard region can be referred to as "a prescribed type region different from both of the type I region and type II region".

(4) The relationship between the reading setting (reading condition) and the analysis processing to be applied may differ from the relationship shown in FIGS. 7 to 8. For example, a threshold for the reading area size AS may differ from "A5," but may be "A4," for example. The first analysis processing may be selected irrespective of the reading area size AS when the specified reading section RD is the first reading section 162. This ensures that when the specified reading section RD is the first reading section 162, the second analysis processing will not be selected irrespective of the reading area size AS. Or, both of the first and second analysis processings may be selected irrespective of the reading area size AS when the specified reading section RD is the first reading section 162. Or, both of the first and second analysis processings may be selected irrespective of the graphic ratio Rgr when the specified reading section RD is the first reading section 162 and the reading area size AS is larger than or equal to the threshold.

The relationship between the reading setting (reading condition) and necessity of analysis processing may differ from those shown in FIGS. 5A-5C and 6A-6E. For example, in the embodiments, the upper limit of the reading resolution RS, for which "not to analyze" is determined, is "100". However, the upper limit of the reading resolution RS may be "200". Further, the analysis processing may be executed irrespective of the reading setting.

(5) The type II profile PFp for the type I regions may be previously determined. For example, the profile generation section 252 may be configured to generate only the type III profile PFg depending on the analysis results. Further, the profile generation section 252 may be omitted.

(6) In the embodiments, the RGB color space is set as the output color space, into which input color values are converted by using the color conversion profiles. However, any color spaces other than the RGB color space may be set as the output color space. For example, such a color space that is represented by color materials used in the printer 170 (CMYK color space, for example) may be set as the output color space. In this case, the color conversion section 320 can generate image data for printing by executing the color conversion.

(7) In the embodiments, an image processing function, that is, the functions of the processing control section 200 and image processing section 300 are implemented by the multifunction apparatus 100 as shown in FIG. 1. However, the image processing function (the functions of the processing control section 200 and image processing section 300) may be implemented by a device other than the multifunction apparatus 100 such as a digital camera, a scanner, a personal computer, and a smartphone. The function of the processing control section 200 may be implemented by a device other than a device that implements the function of the image processing section 300. The function of the processing control section 200 may be divided into a plurality of portions, and the plurality of portions of the function be assigned to a plurality of devices such as computers that can communicate with one another over a network. The entire function of the processing control section 200 is implemented by the plurality of devices. In this case, the system including the plurality of devices corresponds to a control apparatus. Similarly, a system including a plurality of devices may execute, as a whole, the function of the image processing section 300. In this case, this system corresponds to an image processing device. Further, a device or a system that implements the functions of the processing control section 200 and image processing section 300 can be referred to as an image processing device.

In each of the above-described embodiments and modifications, part of the configuration implemented by hardware may be replaced with software and, in contrast, part or whole of the configuration implemented by software may be replaced with hardware. For example, the function of the processing control section 200 shown in FIG. 1 may be implemented by a hardware circuit including a logic circuit.

Further, when part or whole of the function of the multifunction apparatus 100 is implemented by a computer program, the program can be stored in a computer-readable medium such as a non-volatile medium and provided to a user. The program can be used in a state of being stored in a storage medium (computer-readable medium) which is the same as or different from the storage medium in which the program is originally stored when the program is offered to the user. The "computer-readable medium" is not limited to a portable storage medium such as a memory card or a CD-ROM, but may include an internal storage device such as various ROMs that is provided in a computer and an external storage device such as a hard disk drive that is connected to the computer.

While the invention has been described in detail with reference to the embodiments and modifications thereof, it would be apparent to those skilled in the art that various changes and modifications may be made therein without departing from the spirit of the invention.

What is claimed is:

1. A control apparatus for controlling processing of an image read by a reading device, the reading device having a plurality of reading sections, each reading section being configured to read an image from a document, the control apparatus comprising:
   a controller configured to operate as:
   identifying to identify a reading condition instructed for reading an image from a document; and
   determining to determine, in accordance with the identified reading condition, a method of an analysis processing to be applied to a read out image,
   the identifying to identify a reading condition including identifying to identify, among the plurality of reading sections, a reading section that is instructed to read an image from the document,
   if the identified reading condition satisfies a first condition, the determining to determine a method of an analysis processing includes determining a first analysis processing as the analysis processing to be applied to the read out image, the first condition including a condition that the identified reading section is a first reading section configured to read an image from a document while maintaining the document to be stationary, the first analysis processing being configured to extract a first type region from the read out image, and
   if the identified reading condition satisfies a second condition, the determining to determine a method of an analysis processing includes determining a second analysis processing as the analysis processing to be applied to the read out image, the second condition including a condition that the identified reading section is a second reading section configured to read an image from the document while conveying the document, the second analysis processing being configured to extract a second type region from the read out image.

2. The control apparatus according to claim 1, wherein the controller configured to further operate as:
determining to determine a color conversion profile to be used in a color conversion for adjusting a color value representative of color of the read out image,
the determining to determine a color conversion profile including:
determining a first type color conversion profile as a color conversion profile to be applied to a prescribed type region which is different from both of the first type region and the second type region, and
determining a second type color conversion profile as a color conversion profile to be applied to the first type region, the second type color conversion profile being different from the first type color conversion profile.

3. The control apparatus according to claim 2, wherein the second type color conversion profile is configured such that a post-conversion color value that is associated with a pre-conversion first color value by the second type color conversion profile is different from a post-conversion color value that is associated with the same pre-conversion first color value by the first type color conversion profile, the pre-conversion first color value being included in a prescribed color gamut.

4. The control apparatus according to claim 1, wherein the controller configured to further operate as:
determining to determine a color conversion profile to be used in a color conversion for adjusting a color value representative of color of the read out image,
the determining to determine a color conversion profile including:
determining a first type color conversion profile as a color conversion profile to be applied to a prescribed type region which is different from both of the first type region and the second type region, and
determining a third type color conversion profile as a color conversion profile to be applied to the second type region, the third type color conversion profile being different from the first type color conversion profile.

5. The control apparatus according to claim 4, wherein the third type color conversion profile is configured such that difference between a first post-conversion color value and a second post-conversion color value increases as saturation of a pre-conversion second color value increases, the first post-conversion color value being defined that is associated with the pre-conversion second color value by the third type color conversion profile, the second post-conversion color value being defined that is associated with the same pre-conversion second color value by the first type color conversion profile.

6. The control apparatus according to claim 1, wherein the identifying to identify a reading condition further includes identifying to identify a size of an area of the image instructed to be read out,
the first condition further includes a condition that the identified size is smaller than a prescribed size, and
wherein if the identified condition satisfies a third condition, the analysis determination determines both of the first and second analysis processings as the analysis processing to be applied to the read out image, the third condition including a condition that the identified reading section is the first reading section and the identified size is larger than or equal to the prescribed size.

7. The control apparatus according to claim 6, wherein the third condition further includes a condition that a ratio of an area of the second type region relative to an area of the read out image is smaller than or equal to a prescribed reference ratio.

8. The control apparatus according to claim 1,
wherein the controller configured to further operate as:
determining to determine a color conversion profile to be used in a color conversion for adjusting a color value representative of color of the read out image,
wherein if the identified reading condition coincides with a first reading condition, the determining to determine a method of an analysis processing includes determining no analysis processing to be applied to the read out image, and the determining to determine a color conversion profile includes determining the first type color conversion profile as a color conversion profile to be applied to an entire part of the read out image, and
if the identified reading condition coincides with a second reading condition, the determining to determine a method of an analysis processing includes determining an analysis processing to be applied to the read out image, and the determining to determine a color conversion profile includes determining a color conversion profile to be applied to a region that is extracted by the determined analysis processing from the read out image.

9. The control apparatus according to claim 1,
wherein the controller configured to further operate as:
determining to determine a color conversion profile to be used in a color conversion for adjusting a color value representative of color of the read out image,
the determining to determine a color conversion profile includes generating to generate the color conversion profile in accordance with a result of the analysis processing.

10. A method for controlling processing of an image read by a reading device, the reading device having a plurality of reading sections, each reading section being configured to read an image from a document, the method comprising:
identifying to identify a reading condition instructed for reading an image from a document; and
determining to determine, in accordance with the identified reading condition, a method of an analysis processing to be applied to a read out image,
the identifying to identify a reading condition including identifying to identify, among the plurality of reading sections, a reading section that is instructed to read an image from the document,
if the identified reading condition satisfies a first condition, the determining to determine a method of an analysis processing includes determining a first analysis processing as the analysis processing to be applied to the read out image, the first condition including a condition that the identified reading section is a first reading section configured to read an image from a document while maintaining the document to be stationary, the first analysis processing being configured to extract a first type region from the read out image, and
if the identified reading condition satisfies a second condition, the determining to determine a method of an analysis processing includes determining a second analysis processing as the analysis processing to be applied to the read out image, the second condition including a condition that the identified reading section is a second reading section configured to read an image from the document while conveying the document, the second analysis processing being configured to extract a second type region from the read out image.

11. A non-transitory computer-readable medium storing a set of program instructions for controlling processing of an image read by a reading device, the reading device having a plurality of reading sections, each reading section being configured to read an image from a document, the program instructions, when executed by a computer, causing the computer to perform:

identifying to identify a reading condition instructed for reading an image from a document; and determining to determine, in accordance with the identified reading condition, a method of an analysis processing to be applied to a read out image, the identifying to identify a reading condition including identifying to identify, among the plurality of reading sections, a reading section that is instructed to read an image from the document, if the identified reading condition satisfies a first condition, the determining to determine a method of an analysis processing includes determining a first analysis processing as the analysis processing to be applied to the read out image, the first condition including a condition that the identified reading section is a first reading section configured to read an image from a document while maintaining the document to be stationary, the first analysis processing being configured to extract a first type region from the read out image, and if the identified reading condition satisfies a second condition, the determining to determine a method of an analysis processing includes determining a second analysis processing as the analysis processing to be applied to the read out image, the second condition including a condition that the identified reading section is a second reading section configured to read an image from the document while conveying the document, the second analysis processing being configured to extract a second type region from the read out image.

\* \* \* \* \*